March 1, 1960 C. L. NEAL 2,927,259
TRANSISTOR TIME DELAY DEVICE
Filed Feb. 9, 1959
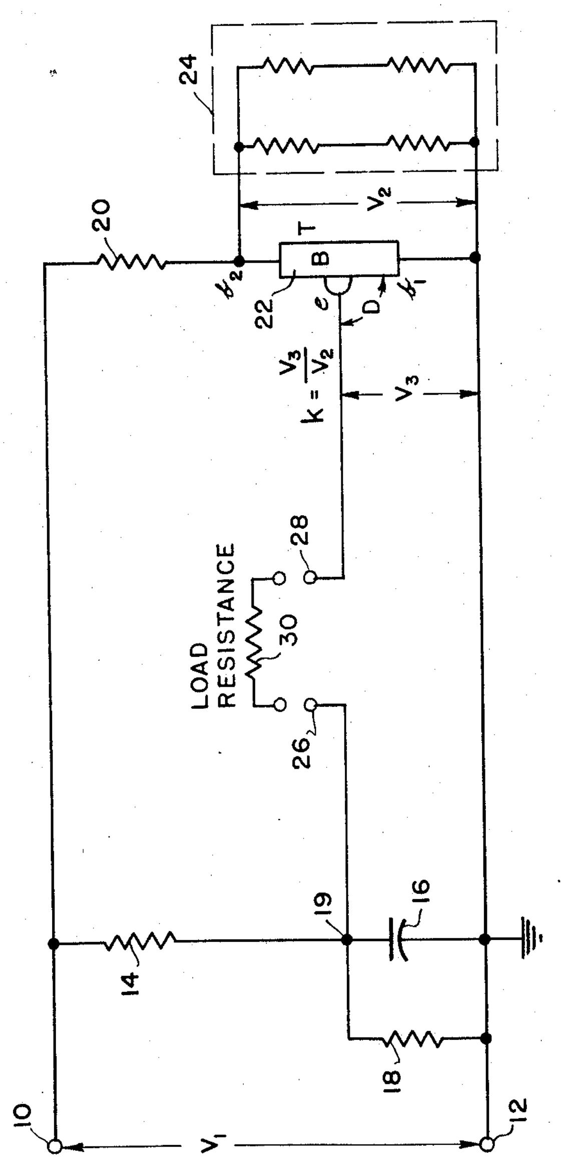
INVENTOR.
CONRAD L. NEAL
BY
J. M. St. Amand
ATTORNEYS.

United States Patent Office 2,927,259

Patented Mar. 1, 1960

2,927,259

TRANSISTOR TIME DELAY DEVICE

Conrad L. Neal, China Lake, Calif., assignor to the United States of America as represented by the Secretary of the Navy Application February 9, 1959, Serial No. 792,234

5 Claims. (Cl. 320—1)

(Granted under Title 35, U.S. Code (1952), sec. 266)

The invention herein described may be manufactured and used by or for the Government of the United States of America for governmental purposes without the payment of any royalties thereon or therefor.

The present invention relates to timers and more particularly to an electronic analog time delay circuit.

The present invention is used to provide a prescribed time delay where small size and low weight, withstanding high shock up to 3000 g's and high vibration accelerations well above 10 g's at its resonant frequency, operation from low voltage supplies, low power consumption, and maintaining an accuracy of plus or minus five percent or better in its true delay over a temperature range of −60° F. to +160° F. are required. Prior time delay systems included: mechanical time delay units which can not withstand the high shock and vibration accelerations of the present analog timer; electromechanical time delay units which have the same disadvantages as a mechanical timer plus the added disadvantages of large size, high power input requirements and high weight; pyrotechnic time delay units which have poor accuracy over the temperature range of −65° F. to 165° F.; electronic tube time delay circuits which require high input voltage and power, and will not withstand the high shock and vibration accelerations required of the present invention; and electronic transistor time delay circuits which may perform the same functions as the present invention but which are much more complicated and more difficult to reproduce.

It is an object of the present invention, therefore, to provide a time delay circuit having a high degree of accuracy over a relatively large temperature range with a high energy output and ability to control the time delay without affecting the accuracy with temperature.

It is another object of the invention to provide a compact time delay circuit that will withstand high shock and vibration.

A further object of the invention is to provide a low voltage and low power consumption time delay circuit.

Other objects and many of the attendant advantages of this invention will become readily appreciated as the same becomes better understood by reference to the following detailed description when considered in connection with the accompanying drawings wherein:

The figure is a schematic diagram of a transistorized analog time delay circuit.

The circuit comprises a pair of input terminals 10 and 12 across which an input voltage $V_1$ is applied, terminal 12 being connected to common ground. One end of a charging resistor 14 is connected to terminal 10, the other end of this resistor being connected at 19 to one side of charging capacitor 16; 18 represents the leakage resistance of capacitor 16. The other side of capacitor 16 is connected to terminal 12 and thus to ground. One end of a temperature compensation resistor 20 is also connected to terminal 10, the other end of temperature compensation resistor 20 being connected to base two $b_2$ of unijunction transistor 22 and to one side of a thermistor 24. Base one $b_1$ of unijunction transistor 22 and the other side of thermistor 24 are also connected to terminal 12 and to ground. Point 19 between charging resistor 14 and capacitor 16 is connected to a first output terminal 26; emitter $e$ of unijunction transistor 22 is connected to a second output terminal 28. Resistance 30 represents the resistance of the load across output terminals 26 and 28.

As previously mentioned, $V_1$ is the input voltage; $V_2$ is the base-to-base voltage across the base of transistor 22 from $b_1$ to $b_2$, B representing the interbase resistance of the unijunction transistor; and $V_3$ is that voltage that must be applied to the emitter to turn transistor 22 on. D represents the diode barrier potential; this potential D is a value of voltage drop found in all junction diodes and is independent of the forward current.

The transistorized analog timer is actually a relaxation oscillator. Use of the unijunction transistor 22 as the switching element improves the accuracy of the time delay sufficiently to make the circuit useful as a timer because of the ability of the transistor to be actuated repeatedly by the same voltage $V_3$. This actuating voltage $V_3$ is a fixed percent (called standoff ratio, $k$) of the $b_2$ to $b_1$ voltage. The value of this percent depends on the location of the emitter P-N junction between $b_2$ and $b_1$; i.e., if the junction is 75% of the distance from $b_1$ to $b_2$ the standoff ratio will be 75%. Therefore, as long as the $b_2$ to $b_1$ voltage is a constant the actuating voltage will be constant. The standoff ratio is also defined by the equation $$V_3=kV_2+D \qquad (1)$$

Since the value of the diode junction potential D is very small, compared to the unijunction transistor actuating voltage $V_3$ and the base-to-base voltage $V_2$ used with this circuit, it can be dropped from the equation and the standoff ratio can be given by:

$$k=\frac{V_3}{V_2} \qquad (2)$$

In other words, it can be said that the actuating voltage $V_3$ is a fixed percent of the base-to-base voltage $V_2$.

When the input voltage $V_1$ is applied across input terminals 10 and 12 capacitor 16 begins to charge through charging resistor 14. This charging continues until the voltage on the capacitor reaches the required value $V_3$. At voltage $V_3$ the transistor is turned on and the energy of capacitor 16 is discharged into the load resistance 30 through the P-N junction at the transistor to ground. Thus the energy stored in capacitor 16 during the time delay is used as the output.

The unique temperature compensation circuit makes this circuit acceptable as a time delay circuit.

The base-to-base resistance B of the unijunction transistor 22 increases with temperature. The capacitance and leakage current of condenser 16 also increase with temperature. All these effects cause the time delay to increase with increasing temperature. A thermistor 24 in parallel with the base of transistor 22 and in series with resistor 20 is made to cancel these effects. As the temperature increases the resistance of thermistor 24 decreases causing an increase in the current through resistor 20. This increase in current through resistor 20 causes a decrease in the base-to-base voltage $V_2$. The triggering voltage $V_3$ is a fixed percent of $V_2$ and thus will decrease. By proper choice of thermistor 24 and resistor 20 the changes in capacitor 16 and transistor 22 can be compensated for.

The analog timer of the present invention has the very desired property of having a very low sensitivity to changes in input voltages $V_1$. This is due to the fact that the basic circuit forms a bridge circuit. Charging resistor 14 and capacitor 16 form two legs of the bridge, and the resistance from base two to the emitter of transistor 22 along with the resistance from the emitter to base one of transistor 22 form the other two legs of the bridge circuit. The centers of these two sets of bridge legs are connected through the load resistance 30. Any change in the applied voltage will effect each side of the load resistance approximately equally; however, this is somewhat upset by the value of the diode barrier potential D, but since D is very small it has very little effect. Thus in the present circuit a high degree of accuracy is obtained in the time delay over a large temperature range together with a high energy output and ability to change charging resistor 14 to control the time delay without effecting the accuracy with temperature.

Another embodiment of the invention is to use a capacitor with a low temperature coefficient of capacitance and leakage. By using this type of capacitor and maintaining a low input voltage resistor 20 and thermistors 24 could be eliminated. However, this would greatly decrease the energy output and/or greatly increase the size and mass of the timer, and such an increase in size and mass may decrease the shock and vibration capabilities of the timer.

Obviously many modifications and variations of the present invention are possible in the light of the above teachings. It is therefore to be understood that within the scope of the appended claims the invention may be practiced otherwise than as specifically described.

What is claimed is:

1. A transistor time delay device comprising first and second input terminals and first and second output terminals, a load connected across said output terminals, said first input terminal being connected to one side of a charging resistor and to one side of a temperature compensating resistor, the other side of said charging resistor being connected to one side of a charging capacitor and to said first output terminal, said second output terminal being connected to the P-N junction of a transistor, the base of said transistor being connected between the other side of said temperature compensating resistor and said second input terminal, the other side of said charging capacitor also being connected to said second input terminal, and a thermistor connected across the base of said transistor; an input voltage applied across said input terminals being operable to charge said charging capacitor through said charging resistor until the voltage on the capacitor reaches the voltage required to be applied to the transistor P-N junction to turn on the transistor, on reaching said required voltage said capacitor operable to discharge into said load through said transistor P-N junction, the energy stored in said capacitor during time delay being the output of the circuit.

2. A device as in claim 1 wherein said charging resistor is used for controlling the time delay.

3. A transistor time delay device comprising first and second input terminals, a load resistance connected across said output terminals, said first input terminal being connected to one side of a charging resistor and to one side of a temperature compensating resistor, the other side of said charging resistor being connected to one side of a charging capacitor and to the first output terminal, said second output terminal being connected to the P-N junction of a unijunction transistor, the base of said transistor being connected between the other side of said temperature compensating resistor and said second input terminal, said second input terminal being connected to common ground, the other side of said charging capacitor also being connected to said second input terminal, and a thermistor circuit connected across the base of said transistor; an input voltage applied across said input terminals being operable to charge said charging capacitor through said charging resistor until the voltage on the capacitor reaches a voltage required to be applied to the transistor P-N junction to turn on the transistor and on reaching said required voltage said capacitor operable to discharge into said load resistance through said transistor P-N junction.

4. A transistor time delay device comprising first and second input terminals and first and second output terminals, a load resistance connected across said output terminals, the base of a unijunction transistor being connected across said input terminals, said first input terminal being connected to one side of a charging resistor, the other side of said charging resistor being connected to one end of a charging capacitor having a low temperature coefficient of capacitance and leakage and to the first output terminal, said second output terminal being connected to the P-N junction of said unijunction transistor, the other side of said charging capacitor being connected to said second input terminal, an input voltage applied across said input terminals being operable to charge said charging capacitor through said charging resistor until the voltage on the capacitor reaches the voltage required to be applied to the transistor P-N junction to turn on the transistor and on reaching said required voltage said capacitor operable to discharge into said load resistance through said transistor P-N junction.

5. A device as in claim 4 wherein said charging resistor is used for controlling the time delay.

References Cited in the file of this patent

FOREIGN PATENTS 815,361 Great Britain ------------ June 24, 1959